United States Patent

[11] 3,564,331

| | | |
|---|---|---|
| [72] | Inventor | Thomas H. Moore<br>Santa Ana, Calif. |
| [21] | Appl. No. | 779,912 |
| [22] | Filed | Nov. 29, 1968 |
| [45] | Patented | Feb. 16, 1971 |
| [73] | Assignee | North American Rockwell Corporation |

[54] MESHLESS STORAGE TUBE
23 Claims, 3 Drawing Figs.

[52] U.S. Cl............................................. 315/12,
313/68
[51] Int. Cl...................................................... H01j 29/41
[50] Field of Search............................................ 313/68;
315/12

[56] References Cited
UNITED STATES PATENTS

| | | | |
|---|---|---|---|
| 2,918,600 | 12/1959 | Pensak............................ | 313/68X |
| 3,307,061 | 2/1967 | Schlesinger................... | 313/78 |
| 2,904,712 | 9/1959 | Schlesinger................... | 313/78 |
| 2,901,661 | 8/1959 | Neuhauser.................... | 313/68 |
| 2,792,514 | 5/1957 | Rotow........................... | 313/68 |

OTHER REFERENCES

Wohl and Ting, Electrostatic Memory and Storage Display Tube, 2/64, IBM Tech Descl Bull., Vol. 6, No. 9 p. 29
Andersen, A Simplified Direct Viewing Bistable Storage Circuit, 6/22/66, pp. 10— 16.

*Primary Examiner*—Rodney D. Bennett, Jr.
*Assistant Examiner*—Joseph G. Baxter
*Attorneys*—William R. Lane, L. Lee Humphries and Rolf M. Pitts ABSTRACT: A single gun, meshless storage tube of an immersed optics system type, and having an axial electric field generator and a doubly tapered focus deflection field generator. Avoidance of the meshes improves image resolution and structural ruggedness. The tapered axial focus field provides a planar focal surface, as to avoid the necessity for dynamic focusing and the immersed optics provides better resolution. Thus, a given degree of resolution and data density may be obtained with a smaller, ruggeder tube. Because the storage tube dielectric is mounted on a mechanically rigid substrate, greater mismatch of thermal coefficients of expansion between the dielectric and substrate (of the storage element) are tolerable.

INVENTOR.
THOMAS H. MOORE

MESHLESS STORAGE TUBE

CROSS-REFERENCES TO RELATED APPLICATIONS

1. U.S. Pat. No. 3,408,647

BACKGROUND OF THE INVENTION

In a number of different kinds of systems it is necessary to provide temporary storage of large quantities of data (order of $10^7$ bits) in order to change ether the time rate or sequence of the data. As one example, in a PPI radar, a scan converter storage tube is used to convert the 1-frame-per6-second radar input into a 30-frame-per-second television signal to provide a bright, nonflickering display. In this case, the scan converter storage tube increases the time rate of the radar data. As a second example, in an MTI Doppler radar, a storage tube takes the radar signal, which is a function of range with azimuth as a parameter, and feeds the Doppler process a signal which is a function of azimuth with range as a parameter. In this case, the storage tube changes the sequence of the data. A fuller description of such latter application of a scan converter tube is to be found in U.S. Pat. No. 3,408,647 and owned by North American Rockwell Corporation, assignee of the subject invention. A further description may also be found in U.S. Pat. No. 3,346,859 issued to W. H. Mullings, et al. for Mainlobe Doppler Clutter Return Compensation.

The principle development of conventional storage tubes was done during the decade 1945—1955, before the radar data processing applications arose. As a result, all of these tubes were designed to change the time rate of data. In order to accomplish this, it is necessary that the tube be able to output the same data a large number of times. This in turn requires that the storage tube's readout process be essentially nondestructive. As a result, all of the storage tubes presently commercially available are designed for nondestructive readout.

Examples of prior-art mesh structure storage tubes are included in U.S. Pat. No. 2,549,072 to D. W. Epstein for Recording Apparatus for Radar Systems, U.S. Pat. No. 2,728,020 to L. Pensak for Storage Tube, and U.S. Pat. No. 3,174,071 to E. H. Eberhardt for Radar Storage Tube for Indicating Moving Targets.

To date, all storage tubes store data in the form of an electrostatic charge pattern on a thin dielectric. Readout is accomplished by interrogating the charge pattern point-by-point with a focused, constant-current electron beam. The potential produced by the local electrostatic charge forces the read beam electrons to go to one or the other of two electrodes. The current collected on either of these electrodes forms the output signal.

For reasonable data-packing density and sensitivity, the read beam electrons must come very close to the stored electrostatic charge pattern. For nondestructive readout, the read beam electrons normally must not strike the dielectric on which the data are stored. As a result, the target in present commercial storage tubes consists of a fine electroformed metal mesh with dielectric evaporated on one side. The data are stored on the dielectric, and the read beam electrons either pass through the mesh or are reflected from the mesh, depending on the local electrostatic potential. In addition to the target mesh, a decelerator mesh is usually included.

Electrons pass through the mesh holes, or not, depending on the average potential stored on the dielectric surrounding the mesh hole. Thus, present commercial storage tubes form sampled data systems, with the mesh hole and the surrounding dielectric forming the sampling unit. The data packing density obtainable in the mesh-type storage tube is thus directly related to the fineness of the target mesh. Despite a decade of effort, it has not yet been possible to make a practical storage tube mesh with more than about 40 mesh holes per millimeter, which limits the resolution to under 20 cycles/mm.

In addition, any variation in mesh hole size affects the transmission of read beam electrons in the same way as does the stored charge pattern. Thus, an r.m.s.-variation in hole size introduces noise in the output signal. For example, an r.m.s. variation in linear hole size of 0.5 percent limits the output signal-to-disturbance ratio to 40 db. It has not yet been possible to make a practical mesh for a storage tube of sufficient accuracy to yield much more than about 35 db signal-to-r.m.s. disturbance ratio.

Despite the resolution and signal-to-noise limitation of the mesh-type storage tube, it is the only type being sold for new equipment today. The most significant competition that the mesh-type tube has had, has been from the electron-bombardment-induced conductivity (EBIC) storage tube. The storage target in an EBIC tube is a dielectric sheet supported on a mesh. Read beam electrons either struck or were reflected from the dielectric. Although the readout process was destructive, a large number of readouts were obtained by storing a very large signal charge on the target. The large stored charge was obtained by using conductivity induced by bombarding the target with a high energy write beam to produce several hundred signal electrons per write electron. Unfortunately, local variations in EBIC gain plus the same kind of resolution limitations as in the mesh-type tube made EBIC storage tubes less satisfactory than mesh-type storage tubes.

Both the mesh-type and the EBIC storage tubes require a low velocity reading beam. That is, the read beam electrons must be decelerated to essentially zero velocity at the target so that the local target potential can provide the force to either cause the read electrons to continue through the target mesh or be reflected back to the electron gun. As the time during which the read electrons are moving very slowly must be kept short to reduce the effect of spurious electrostatic fields, a strong decelerating field must be produced immediately in front of the target. This requires a second or decelerator mesh immediately in front of the target. The electron beam resolution is thus limited both by the multiple lens effect of the decelerator mesh holes, and by the essentially zero target-cathode voltage.

Use of a fine mesh to support the dielectric requires a precise match of the thermal coefficients of expansion of the dielectric and the mesh. Otherwise, the dielectric will tear the mesh. To date, this constraint has limited mesh-type storage tubes to the use of $CaF_2$ dielectric. Unfortunately, $CaF_2$ is difficult to make with sufficient band gap to remain a good insulator at high temperatures, which failing limits present mesh-type storage tubes to a maximum operating temperature of about 70° C.

In summary, the resolution limitation imposed by both the decelerator and storage meshes and the electron optics prevents present mesh-type storage tubes from providing 50 percent sine wave response at more than about 10 cycles/mm.; variation in mesh hole size limits the signal-to-r.m.s. disturbance in the output to about 35 db; and mesh fragility and dielectric fabrication problems limit maximum operating temperature to about 70° C.

SUMMARY OF THE INVENTION

By means of the concept of the subject invention, the above-described limitations of the prior art are avoided, and an improved storage tube is provided which is specifically adapted for Doppler processing applications.

In a preferred embodiment of the inventive concept, there is provided a meshless storage tube, immersed in an axial magnetic field, in the manner of an immersed optical system. There is also provided a continuous dielectric storage layer having a secondary emission greater than unity and disposed upon an electrically conductive, optically flat substrate and forming a storage target. A tapered focus field generator provides a planar focal surface coincident with the dielectric layer.

In normal operation of the above described arrangement, a read electron beam strikes the target at high velocity; i.e., with sufficient energy that more than one secondary electron is ejected from the target by each primary electron. The signal is generated by allowing the secondary electrons to either return to their points of origin, or to escape from the target entirely, depending on the potential at their point of origin. Use of a high velocity read beam thus removes the requirement for a decelerator mesh near the target. The tube's resolution then improves, both because the electron beams do not pass through a decelerator mesh and because of the relatively large target-cathode voltage.

The meshless storage tube employs an immersed, rather than a thin-lens, electron optical system. (The whole tube is immersed in an axial magnetic field.) The immersed optical system applies forces to the electrons during their entire flight time from cathode to target, and thus gives better resolution than the conventional thin-lens optics. In addition, by properly shaping the magnetic focus field, the focal surface of the electron optical system can be made a plane. As a result, it is not necessary to employ dynamic focusing to maintain high resolution away from the center of the target.

Use of a rigid substrate rather than a fragile mesh to support the dielectric allows a much greater mismatch between the thermal coefficient of expansions of the dielectric and the substrate. Therefore, a wider choice of dielectric materials can be used in the meshless storage tube than in present commercial tubes. (For example, higher band gap dielectric (e.g., $Be_2$) can be used to permit tube operation at high ambient temperatures (e.g., 125° C.). Also, because the use of meshes is avoided, resolution limits of the stored data and introduction of disturbances in the output signal from such source are avoided.

In summary, the described meshless storage tube may provide as much as a 50° sine wave response at 30 to 40 cycles/mm. Because the tube volume required to store a given quantity of data varies to a first approximation as the cube of the resolution, the meshless storage tube allows a substantial volume reduction. Also, because such meshless storage tube has a continuous, smooth target, it does not introduce a disturbance from the target structure into the output signal. As a result, for the operating conditions required in most radars, my meshless storage tube can provide approximately 10 db more peak-to-peak signal to r.m.s. noise ratio than presently available tubes. Moreover, the shaped axial focus field eliminates the requirement for dynamic focus, while the use of a high band gap dielectric permits operation at high ambient temperatures.

BRIEF DESCRIPTION OF THE DRAWINGS

In the drawings like reference characters refer to like elements.

DESCRIPTION OF THE PREFERRED EMBODIMENT

Figure 1:
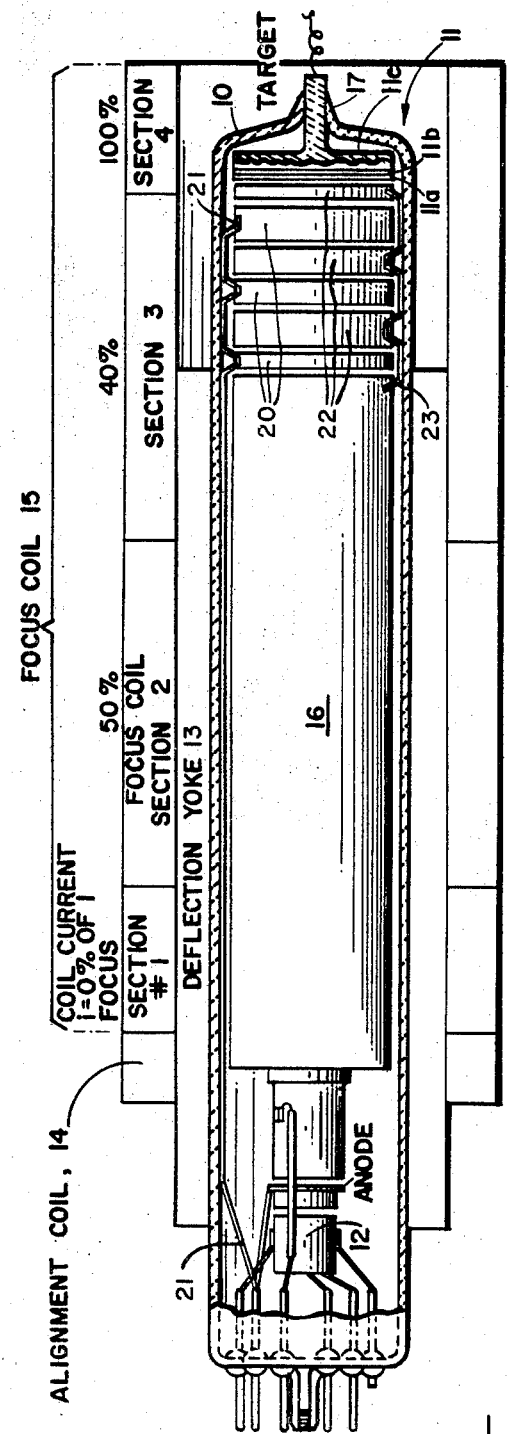
FIG. 1 is a central section of a schematic arrangement of an electron beam tube embodying the inventive concept.

The concept of the electrostatic storage tube, to which the subject invention relates, may be appreciated by reference to the operation of a parallel plate capacitor. A parallel plate capacitor is usually thought of as consisting of two conducting plates separated by a thin sheet of dielectric. However, the actual capacitor is the thin dielectric sheet which separates electrical charges held in shallow surface traps, the conducting plates serving only as a convenient means for supplying or removing these electrical charges.

Thus, if one of the conducting plates is removed and electrons are supplied to or removed from that side of the dielectric sheet by an electron beam, the parallel plate capacitor still exists. However, with no conducting plate, the electrons supplied by the beam (or the holes left if the beam removed electrons) cannot move in any direction. Thus, the beam can deposit charges in a pattern and the pattern will remain for a time determined by the ohmic relaxation time of the dielectric. The charge pattern will produce a voltage pattern which can then be used to modulate a readout electron beam.

An electrical-input, electrical-output, electrostatic storage device thus consists of a writing electron beam, a storage target coated with a thin dielectric layer, a readout beam, an erase beam, a vacuum housing, and usually an external electron optical system. The three electron beams may be provided by one electron gun, as in the single-gun storage tube.

The Langmuir limit shows that higher current density and, hence, higher resolution is obtained at an electron beam's target when the beam strikes the target with an energy as high as possible (where such energy is a function of the potential difference V between the target and the cathode of the electron gun). Therefore, best performance is obtained when low electron velocity operation is avoided. The high-velocity writing process is accomplished as follows:

Electrons travel from the gun to the target in the positive axial direction (e.g., toward the target). Beam electrons striking the target surface impart energy via collisions to valence electrons in the target dielectric material. Some of the excited valence electrons will obtain sufficient energy in the negative axial direction to overcome the potential barrier (work function) at the target surface and will be emitted from the target, which electrons are called secondary electrons. The number $\delta$ of secondary electrons excited from the target per primary electron, will increase with V until a maximum is reached. As V increases beyond a limit value $V_{max}$, the primary electrons penetrate so far into the target that the secondary electrons have a smaller probability of being able to reach the target surface with sufficient remaining energy to be emitted.

Thus, when a high-velocity electron write beam, $I_w$, strikes the surface of the dielectric sheet, a current $\delta I_w$ is emitted. Initially, if there is no potential pattern on the dielectric, the secondary electrons will move away from the target and be collected on the positive write gun electrodes. The initial displacement current $I_i$ through the parallel plate capacitance of the area of the dielectric from which secondary electrons are being emitted will cause the potential of the dielectric surface to charge positively. The electrostatic potential in the space about the target surface is a function of the voltages on the surfaces bounding the volume of space containing the target and the electron optical system. The voltage of the target element being struck by the write-beam rises, but the potential in space, at an axial distance from the target element, rises much more slowly because all the other voltages on the bounding surfaces remain constant. Thus, as the element being written charges positive, a negative electric field forms next to the positive target element.

As the element being written charges positive, more and more of the secondary electrons will not have sufficient energy to overcome the negative electric field. These lower energy secondary electrons will be forced back to the target element, reducing the net displacement current through the dielectric.

When the write beam strikes a single target element, the initial displacement current is $(\delta - 1.)I_w$. The displacement current will drop to zero if the element voltage rises to a limit voltage $V_e$.

The reading process is essentially the converse of the writing process. As an unmodulated read beam, $I_r$, is scanned over the target, those areas which were charged to the limit voltage $V_e$ (or nearly so) by the modulated write beam $I_w$ will accept zero displacement current, and the net current escaping from the target from those elements will be $I_r$. Those areas which were not charged by $I_w$ will be charged by the read beam, producing a displacement current through the target element; and the net current escaping the target from these elements will be greater than $I_r$. A signal can be obtained (from the secondary electrons) either by putting a signal resistor in series with the target backplate lead (vidicon readout) or by collecting the next current escaping from the target (return beam readout).

Return beam readout is required if the target is large and the backplate has a large stray capacitance. Also, return beam readout permits the use of an electron multiplier which can boost the video signal to the point that preamplifier noise is not a limiting factor in the signal-to-noise ratio. Vidicon readout is simpler, and has a slight advantage in tube noise factor.

A preferred embodiment of the electrostatic storage tube of the invention is shown in FIG. 1.

Referring to FIG. 1, there is illustrated in central section a schematic arrangement of a device embodying the inventive concept. There is provided an electron beam storage tube of an immersed electron optics type and comprising a sealed tubular glass envelope 10 enclosing a storage target 11 (of about 4 cm diameter) near one axial end thereof and a modulatable electron beam gun 12 at the opposite end of envelope 10. A deflection yoke 13 is mounted externally concentrically of envelope 10. An alignment coil 14 and a focusing coil 15 are mounted externally concentrically of yoke 13. Gun 12 may be a standard commercially available type such as Model SE—200v. manufactured by Superior Electronics and having a nominal limiting aperture of 50 $\mu m$ diameter for operation at a relatively high beam current of, say, 1,500 nanoamperes, and is employed for each of the write, read and erase modes of operation upon storage target 11.

An electrostatic shield 16 provides a substantially electrostatic field-free deflection region axially disposed between target 11 and gun 12, and comprises a low conductivity layer of nichrome, deposited on the inside surface of envelop 10 to a thickness of about 1,000 angstroms. Where a structurally self-supporting shield is used, such shield may be comprised of 75 microns of nichrome.

Figure 2:
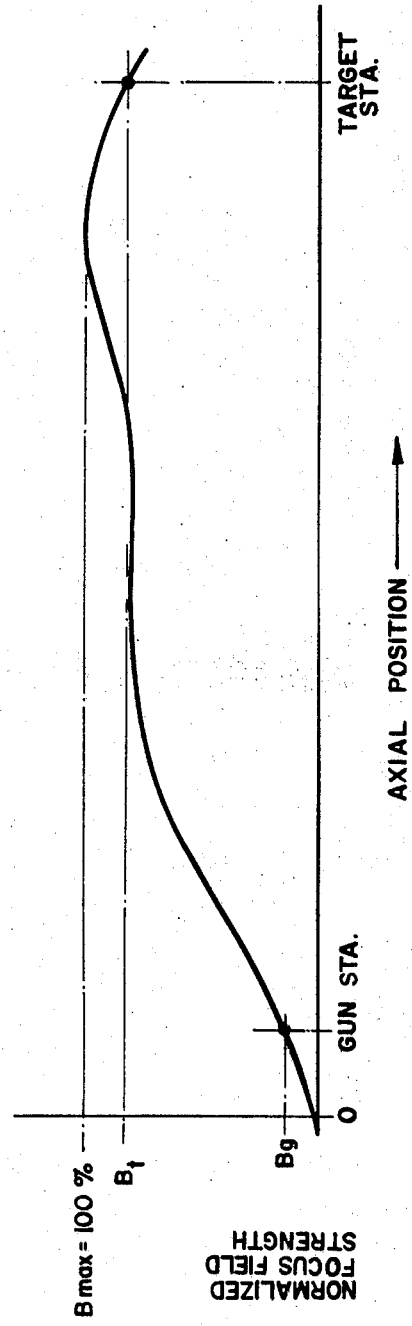
FIG. 2 is a diagram of representative relative axial field strength versus axial position for an exemplary arrangement of the embodiment of FIGS. 1 and 2.

Focus coil 15 is comprised of four axial coil sections, the current through each of which may be separately adjusted or the coil winding density may be varied to provide a relatively constant magnetic flux density through the region of deflection yoke 13, while also providing a doubly tapered focus field along the axis of envelope 10, the maximum field intensity occurring at an axial portion of the field intermediate the target 11 and gun 12, a ratio of $B_t/B_g$ as high as 11:1 being provided, with $B_{max} > B_t B_g$, where $B_t$ is the axial component of flux density at target 11 and $B_g$ is the axial component of flux density at electron gun 12. A representative graph of the normalized axial component of focus field flux density along the longitudinal axis of the tube 10 is shown in FIG. 2. Because of the high ratio of $B_t/B_g$, the focal point of the electron beam (provided by gun 12) describes a planar surface coincident with the writing surface of storage target 11, over which substantially constant resolution is obtained.

A further desired property of the focus-deflection field for resolution improvement purposes is that the ratio $B_f/B_d$, as a function of axial displacement, be substantially uniform, where $B_f$ is the magnetic focus field and $B_d$ is the magnetic deflection field. In other words, the intensity of the deflection field, although varied as a function of a desired deflection, preferably varies along the optical axis of tube 10 similarly as the focus field. Such normalization of the deflection field to the focus field may be effected by compensatory tapering of the winding of the coils comprising the deflection yoke 13.

Storage target 11 is essentially a nonorganic dielectric film 11a vapor-deposited or otherwise bonded to a metallic or electrically conductive backplate 11b. Dielectric film 11a has a secondary emission ratio greater than unity and preferably as high as 3:1. Further properties preferred in such dielectric are:

1. The lateral resistivity must be sufficiently high that the charge pattern does not spread across the target surface in the time interval between reading and writing.

2. The bulk resistivity must be sufficiently high (at least $20^{13}$ ohm-centimeters) that the charge pattern does not leak through the dielectric to the backplate in the interval between writing and reading.

3. The material must withstand the exhaust-bake process required to produce a vacuum tube of high quality.

Specimen materials which may be employed are calcium fluoride ($CaF_2$), magnesium fluoride ($MgF_2$), magnesium oxide ($Mg_2$), beryllium oxide (BeO) and silicon monoxide-dioxide ($S_iO$—$S_iO2$), with uniform thicknesses ranging from as low as 0.05 $\mu m$ to as high as 2.0 $\mu m$. In general, such dielectric composition may be of a divalent metal from the upper left corner of the periodic table, combined with a divalent nonmetal from the upper right corner of the periodic table. For example, the use of a 0.75 $\mu m$ layer of beryllium oxide may be preferable.

A nichrome film of 500 to 1000 angstroms, deposited on a mechanically rigid glass base 11c, is preferably employed as the metallic backplate of target 11 because of its inexpensiveness and the ease with which it is deposited by vapor deposition techniques. Also, it bonds well to glass and is relatively chemically inert. The glass substrate 11c upon which the metallic film is deposited serves to provide geometric stability and structural integrity, and is preferably of a type having a thermal coefficient of expansion matching the dielectric to reduce thermal stresses induced during the process of storage tube manufacture. Such a type of glass to match BeO is Corning type 7056. Substrate 11c is, in turn, mounted relative to the glass envelope of tube 10 and in the embodiment of FIG. 1 includes a stud mounted in the tip 17 of the glass envelope, as shown more particularly in FIG. 3.

Figure 3:
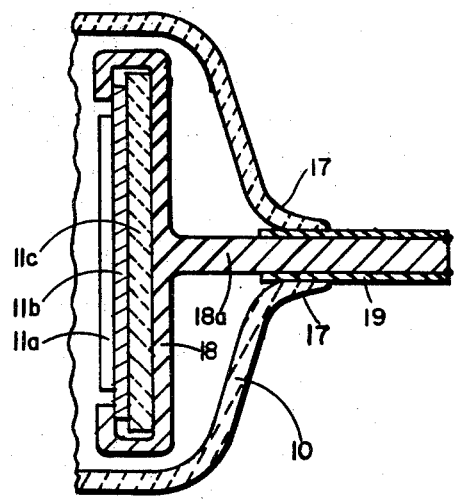
FIG. 3 is a central section of a portion of the tube of FIG. 1, showing a preferred arrangement of the target assembly in further detail.

Referring to FIG. 3, there is shown in detail a preferred arrangement for mechanically mounting and electrically connecting the target assembly 11 of FIG. 1. Glass substrate 11c is mounted in a stainless steel clamp 18, which clamp is also electrically connected to metallic plate 11b. Clamp 18 includes a stud 18a for mechanical mounting within the tip 17 of the glass envelope of tube 10, while also projecting through tip 17. A metallic alloy sleeve 19 of Kovar and having a like thermal coefficient of expansion as the glass envelope, is employed as a hermetic seal between the envelope and stud 18a, and is heliarc-welded to stud 18a at the exposed extremity thereof, so as to also serve as an external electrode for metallic target plate 11b.

An additional structural feature of the arrangement of FIG. 1 is an electrostatic field transition means axially interposed between shield 16 and target 11 and particularly useful where an electron multiplier is included in the arrangement of FIG. 1 for collection of the return beam to achieve increased signal output. Such electrostatic field transition feature is comprised of an assembly of at least four axially spaced electrically conductive rings, each concentrically disposed about the optical axis. The axial length of the assembly is substantially equal to the diameter of electrostatic shield 16. A first set 20 of alternate rings of the assembly and having a ring proximate electrostatic shield 16 are commonly connected (by connector 21) to a source of potential substantially equal to that of target backplate 11b. A second set 22 of alternate rings and including a ring proximate target 11, are commonly electrically connected (by line 23) to electrostatic shield 16.

The peripheral areas of successive rings of each set of rings are progressively lesser, the ring adjacent shield 16 of the first set being of a least peripheral area, and the ring adjacent target 11 of the second set being of a least area, the peripheral areas of successive rings of each set of rings preferably representing an arithmetic progression. For each of the two sets of three rings illustrated in FIG. 1, for example, the peripheral areas would be in the ratio, 1:2:3. Such assembly allows the electrostatic space potential to change from the wall voltage (of shield 16) to the surface voltage of target 11 uniformly (as a function of axial position) and without the generation of radial components of electrostatic (electric) field.

Alternatively, a helical electrical resistive structure, adapted to be connected across a voltage source, may be employed for such transition structure. Where an electron beam multiplier is not included in the arrangement of FIG. 1, such electrostatic field transition means may be omitted, and the sleeve of shield 16 extended axially to the right (in FIG. 1) to within about 0.5 mm. of target 11.

In normal operation of the device of FIG. 1, in an erase mode, the wall voltage of shield 16 is set equal to the target backplate voltage (e.g., 435 volts) and the target 11 scanned by an out-of-focus, high-current erase beam. As the secondary emission ratio of the target (to 435 volt electrons) exceeds unity, the target surface stabilizes at approximately 435 volts. In the write mode of operation, the voltage of shield 16 is raised (e.g., to 500 volts) and the target is scanned with a focused electron beam, the beam being modulated by a video signal applied to a control grid of gun 12, whereby a positive charge pattern is developed on target 11. In an airborne AMTI application, such as that described in the above noted U.S. Pat. No. 3,408,647; in the read mode, the target 11 is scanned with like applied voltages, the reading-beam generating a signal by charging positive all of those target areas which were not charged positive by the write-beam.

Accordingly, there has been described a meshless electrostatic storage tube of improved resolution, improved signal-to-noise ratio, reduced size, increased ruggedness and operable over a wider range of temperatures, as compared to prior-art mesh-type storage tubes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A single gun, meshless storage tube of an electron-optics type immersed in an induced magnetic field and comprising a continuous dielectric storage layer having a secondary emission ratio greater than unity, the layer being oriented transversely of an optical axis of said immersed electron optics type tube.

2. The device of claim 1 in which there is further included means for providing a transition gradient electrostatic field interposed at said dielectric storage layer.

3. The device of claim 1 in which said dielectric layer is of a material having a bulk resistivity of at least $10^{13}$ ohm-centimeters at ordinary operating temperatures.

4. The device of claim 1 in which there is included means for providing a uniform axial component of electrostatic field over the area of said dielectric storage layer.

5. The device of claim 1 in which said dielectric layer is of a material having a bulk resistivity of at least $10^{13}$ ohm-centimeters at ordinary operating temperatures and in which there is further included transition means for minimizing radial electrostatic field components over the face of said dielectric storage layer.

6. A single gun, meshless storage tube of an electron-optics type, immersed in an induced magnetic field, comprising:
  a dielectric storage layer having a secondary emission ratio greater than unity and disposed upon an electrically conductive backplate, the dielectric layer being oriented transversely of an optical axis of said immersed electron-optics type tube; and
  a focus-deflection field generator for providing a planar focal surface coincident with the said storage layer.

7. The device of claim 6 in which said storage layer is of a material having a secondary emission ratio of at least three.

8. The device of claim 6 in which said storage layer is of a thickness within the range of 0.05 and 2.0 μm and of one of $CaF_2$, $MgO_2$, $MgF_2$, $B_eO$, $s_iO-S_iO_2$.

9. The device of claim 6 in which said storage layer is of a thickness of substantially 0.7 μm and of $B_eO$.

10. The device of claim 6 in which said focus-deflection field generator is arranged to provide a tapered field, a greater field intensity occurring at an axial portion of the field intermediate said dielectric storage layer and an electron gun of said beam storage tube.

11. The device of claim 6 in which said focus-deflection field generator comprises means for generating a doubly tapered focus field in which the ratio $B_t/B_g$ exceeds unity, where $B_t$ is the field strength at the storage layer and $B_g$ is the field strength at an aperture of an electron gun of said storage tube.

12. The device of claim 11 in which said tapered focus-deflection field generator comprises a deflection yoke wound with a tapered windings.

13. The device of claim 6 in which said focus-deflection field generator comprises means for generating a tapered focus-deflection field which is doubly tapered as a function of axial position along said optical axis, and wherein $B_{max} > B_t > B_g$, where
  $B_{max}$ = maximum field strength;
  $B_t$ = field strength at said storage layer; and
  $B_g$ = field strength at an electron gun aperture of said beam storage tube.

14. The device of claim 11 in which said focus-field generating means comprises a focus coil having separately excitable axial coil sections.

15. The device of claim 11 in which said focus field generating means comprises a taper-wound focus coil.

16. The device of claim 6 in which said magnetic focus field generator comprises means for generating a doubly tapered focus-deflection field along the optical axis wherein $B_{max} > B_t > B_g$, where
  $B_{max}$ = maximum magnetic field strength;
  $B_t$ = field strength at storage layer;
  $B_g$ = field strength at an electron gun aperture of said beam storage tube and wherein the ratio $B_F/B_D$ as a function of axial displacement is substantially uniform, where
  $B_F$ = magnetic focus field; and
  $B_D$ = magnetic deflection field.

17. The device of claim 6 in which there is further provided:
  an axial electrostatic field transition means comprising an electrically conductive assembly concentrically disposed about said optical axis and proximate a face of said dielectric storage layer
  A cylindrical electrostatic shield axially disposed between said assembly and the source of an electron beam and concentrically disposed about said optical axis; and
  said electrically conductive assembly having an axial length substantially equal to the diameter of said cylindrical electrostatic shield.

18. The device of claim 6 in which there is further provided an axial electrostatic field generator comprising:
  at least four axially spaced electrically conductive rings concentrically disposed about said optical axis and proximate a face of said dielectric storage layer and forming an assembly; and
  a cylindrical electrostatic shield axially disposed between said assembly and the source of an electron beam and concentrically disposed about said optical axis, a first set of alternate rings being electrically interconnected and being adapted to be further connected to a source of potential substantially equal to that of said target backplate and a second set of alternate rings being commonly electrically connected to the electrostatic shield.

19. The device of claim 18 in which the axial length of said assembly is substantially equal to the diameter of said electrostatic shield.

20. The device of claim 18 in which the axial length of said assembly is substantially equal to the diameter of said electrostatic shield and in which said first set of alternate rings includes a ring adjacent said electrostatic shield and in which said second set of alternate rings includes a ring adjacent said dielectric storage layer.

21. The device of claim 18 in which the peripheral areas of successive rings of each of said sets of rings are progressively lesser:
  said first set including a ring adjacent said electrostatic shield and of a least peripheral area; and
  said second set including a ring adjacent said dielectric storage layer and of a least peripheral area.

22. The device of claim 21 in which the peripheral areas of successive rings of each said sets of rings represent a substantially arithmetic progression.

23. A single-gun, meshless storage tube of an electron-optics type immersed in an induced magnetic field and comprising:
- a continuous dielectric storage layer of limited area and having a secondary emission ratio of at least three and being bonded to an electrically conductive backplate, being oriented transversely of an optical axis of said immersed system type tube;
- at least four axially spaced electrically conductive rings concentrically disposed about said optical axis and proximate a face of said dielectric storage layer and forming an assembly;
- a cylindrical electrostatic shield axially disposed between said assembly and the source of an electron beam and concentrically disposed about said optical axis, a first set of alternate rings being electrically interconnected and being adapted to be further connected to a source of potential substantially equal to that of said target backplate and a second set of alternate rings being commonly electrically connected to the electrostatic shield, the peripheral areas of successive rings of each of said sets of rings being progressively lesser,
- said first set including a ring adjacent said electrostatic shield and of a least peripheral area, and
- said second set including a ring adjacent said dielectric storage layer and of a least peripheral area, the relative magnitudes of the peripheral areas of successive rings of each said sets of rings representing a substantially arithmetic progression.